US008432823B2

(12) United States Patent
Quadri et al.

(10) Patent No.: US 8,432,823 B2
(45) Date of Patent: Apr. 30, 2013

(54) WIRELESS COMMUNICATIONS METHOD AND APPARATUS

(75) Inventors: Sadia Quadri, Bristol (GB); Zhong Fan, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 415 days.

(21) Appl. No.: 12/760,106

(22) Filed: Apr. 14, 2010

(65) Prior Publication Data

US 2010/0296404 A1 Nov. 25, 2010

(30) Foreign Application Priority Data

May 19, 2009 (GB) .................................. 0908615.8

(51) Int. Cl.
*H04L 12/26* (2006.01)
*H04W 72/04* (2009.01)

(52) U.S. Cl.
USPC ........................................................ 370/252

(58) Field of Classification Search ................ 370/229, 370/235, 241, 252, 254; 455/403, 422.1, 455/450
See application file for complete search history.

(56) References Cited

U.S. PATENT DOCUMENTS

| 7,633,884 | B2 * | 12/2009 | Kang ............................ 370/254 |
| 7,881,277 | B2 * | 2/2011 | Hyon et al. .................... 370/348 |
| 8,107,966 | B2 * | 1/2012 | Choi et al. ..................... 455/450 |
| 8,140,085 | B2 * | 3/2012 | Chaudhri et al. ............. 455/450 |
| 8,150,328 | B2 * | 4/2012 | Chaudhri et al. ........... 455/67.11 |
| 2008/0130519 | A1 * | 6/2008 | Bahl et al. ...................... 370/254 |
| 2008/0317062 | A1 * | 12/2008 | Timmers et al. ............... 370/462 |
| 2009/0190508 | A1 * | 7/2009 | Kattwinkel .................... 370/279 |
| 2010/0135226 | A1 * | 6/2010 | Chandramouli et al. ..... 370/329 |
| 2010/0271948 | A1 * | 10/2010 | Challapali et al. ............ 370/235 |
| 2012/0115425 | A1 * | 5/2012 | Subramani et al. ........... 455/120 |

FOREIGN PATENT DOCUMENTS

| GA | 2 379 358 A | 3/2003 |
| JP | 2007-135217 A | 5/2007 |
| JP | 2008-508790 A | 3/2008 |
| WO | WO 2007/031961 A2 | 3/2007 |
| WO | WO 2007/034461 A2 | 3/2007 |
| WO | WO 2009/072087 A1 | 6/2009 |

OTHER PUBLICATIONS

Office Action issued Feb. 28, 2012 in Japanese Patent Application No. 2010-115551 (with English-language translation).

* cited by examiner

*Primary Examiner* — Chi Pham
*Assistant Examiner* — Robert Lopata
(74) *Attorney, Agent, or Firm* — Oblon, Spivak, McClelland, Maier & Neustadt, L.L.P.

(57) ABSTRACT

The invention relates to a method of accessing a channel in a wireless network having a plurality of communication nodes, the method comprising identifying a first channel available for use, forming a cognitive network to manage utilization of said first channel, said cognitive network comprising a leader node and at least one of said plurality of said communication nodes, managing said cognitive network by means of said leader node including identifying a second channel available for use in an event that said first channel being no longer available for use, and switching to said second channel upon said second channel being identified.

21 Claims, 4 Drawing Sheets

WIRELESS COMMUNICATIONS METHOD AND APPARATUS

FIELD OF THE INVENTION

The invention is concerned with a method and apparatus of accessing a communication channel in a radio network, particularly, but not exclusively, in a cognitive radio network.

BACKGROUND OF THE INVENTION

Access to a communications frequency spectrum has traditionally been subject to regulation and restriction. This is for a variety of technical and legal reasons, not least the need to avoid one form of wireless communication interfering with another. In the past, when access to spectrum was not in high demand, and technical limitations prevented fine delineation of 'zones' of the spectrum for different communications uses, regulation was relatively tight. In recent years, this regulation has been relaxed somewhat.

Policies on the liberalisation of the communications spectrum have been formulated by various bodies, not least the United States Federal Communications Commission (FCC) in "Spectrum Policy Task Force," ET Docket No. 02-135, November 2002.

With the liberalisation of spectrum regulations, introduction of flexible spectrum policies and the emergence of cognitive radios, many proposals have been made for cooperative sensing and collaboration for efficient spectrum utilisation by primary (licensed) and cognitive secondary (unlicensed) users of the spectrum. Examples of this can be seen in "Collaborative Spectrum Sensing for Opportunistic Access in Fading Environments," (A. Ghasemi, E. Sousa, 1st IEEE Conference on Dynamic Spectrum Access Network (DySPAN), November 2005), "Cooperative Sensing among Cognitive Radios," (S. Mishra, A. Sahai, R. Brodersen, International Conference on Communications (ICC), June 2006) and "Cooperative Spectrum Sensing in Cognitive Radio Networks," (G. Ganesan, Y. Li, $1^{st}$ IEEE Conference on Dynamic Spectrum Access Network (DySPAN), November 2005).

By way of background, cognitive radio is a field of wireless communications technology in which either a network on a distributed basis or a wireless node in particular can change parameters governing transmission or reception characteristics in order to establish effective communication without interfering with licensed users of a given frequency spectrum. This alteration of parameters can be based on active monitoring of several factors in the external and internal radio environment, such as reservations made of the radio frequency spectrum, user behaviour and network state.

In cognitive radio, spectrum agile radio, or 802.22 WRAN, non-contiguous portions of spectrum are identified as to be managed by a "secondary market mechanism", as discussed in "The Spectrum Framework Review" (OFCOM, November 2004: available at www.ofcom.org.uk/consult/condocs/sfr/sfr), "Spectrum Policy Task Force Report" (Technical Report, FCC, ET Docket 02-135, November 2004) and "Facilitating opportunities for flexible, efficient, and reliable spectrum use employing cognitive radio technologies" (FCC, ET Docket 03-108, December 2003).

In the context of cognitive radio, and in particular with reference to the so called Secondary market mechanism, two sets of users can be considered, namely:

the Primary User (PU)—the licensed user of the spectrum or a user recognised as having high priority for the spectrum band, and the Secondary User (SU)—an opportunistic user or "cognitive" user who accesses spectrum on a temporary basis when PUs are not making use of the spectrum The reader will appreciate that the use of this concept of division between PU and SU user devices is for the purpose of describing the present invention clearly with regard to the prior art, and an actual implementation of cognitive radio could be provided without this distinction being made, either explicitly or implicitly. Indeed, as described later, this distinction between PUs and SUs is not an essential element of the claimed invention.

In order to introduce a secondary user into a channel in a useable spectrum, the fundamental approach adopted at present is to use the available spectrum opportunistically without interfering with the primary. Secondary users (SU nodes) are allowed to use/access the spectrum when the licensed or primary user (PU) is not in use, but should exit once PU arrives. In dynamic situations, every channel is susceptible to channel degradation due to interference, or call termination due to the arrival of a primary user. So, SU nodes periodically monitor the spectrum usage and look for available free channels for transmission.

On vacating the channel required by the primary user, the secondary user scans for the next vacant channel and switches to that channel in order to resume communications. Alternatively an emergency escape route identified in advance can be used, as described in UK Patent Application GB2449224A. In that approach, secondary nodes, wanting to communicate, use the vacant channels opportunistically. These nodes can choose any channel from the multiple vacant channels that are available.

There are many proposals describing how the actual scanning process is achieved. Examples are set out in "On Detecting White Space Spectra for Spectral Scavenging in Cognitive Radios," (F. Harris, Wireless Personal Communications, vol. 45, pp 325-342, 2008), "Candidate Spectral Estimation for Cognitive Radio," (M. Rojas, M. Lagunas, A. Perez, Proc. of the 11th WSEAS Intnl. Conference on Communications, July 2007) and "Spectrum Scanning and Reserve Channel Methods for Link Maintenance in Cognitive Radio Systems," (S. Subramani, S. Armour, D. Kaleshi, Z. Fan, IEEE Vehicular Technology Conference (VTC), May 2008).

The choice of scanning mechanism employed in any particular implementation is beyond the scope of this disclosure.

The scanning process can be carried out in a distributed or centralised manner. In an infrastructure based secondary network, the access point/controller generally executes the scanning process. In contrast, in ad-hoc networks, scanning is carried out in a distributed manner; when SU nodes sense the PU, they individually scan for vacant spectrum and exit communications. Carrying out the scanning process on every node individually can result in the cumulative consumption of battery power being higher than with a centralised approach. Further, the end result may not be an efficient use of the spectrum resource. In addition, individual scanning and exiting of communications might lead to disruption of ongoing communications.

There are many standard bodies focussing on opportunistic spectrum access, which have established teaching in this area. The most well established source of standard setting disclosures is that of the 802 set of networking standards by the IEEE.

802.11h: This amendment to IEEE 802.11™ specifies the extensions to the standard for wireless local area networks (WLANs) which provide mechanisms for dynamic frequency selection (DFS) and transmit power control (TPC) that may be used to satisfy regulatory requirements for operation in the 5 GHz band in Europe. The mechanisms for DFS specified in this amendment are for infrastructure based networks alone.

802.22WG: 802.22 is a new working group of the IEEE 802 LAN/MAN Standards Committee which is seeking to establish standards for the construction of Wireless Regional Area Networks (WRAN) utilizing white spaces (channels that are not already used) in the allocated TV frequency spectrum. The use of the spectrum will be in an opportunistic way in order not to interfere with any TV channel that is transmitting.

US patent application US 2008/0081675 A1 describes a communication network including a plurality of communication devices communicating over multiple systems or channels and also communicating over short range link, such as Personal Area Network (PAN) link. In order to manage access to a channel, each device uses pre-stored scan lists and cooperative scanning. The cooperative scanning involves partitioning the scan lists amongst the plurality of devices via the short range link to reduce battery consumption or enhance performance.

US patent application US 2008/0039105 A1 is concerned with determining a channel for communication, in a multi-device network. During operation of a secondary communication system, cells are formed by a plurality of localised nodes to alert other nodes within the cell of frequencies which must be protected or otherwise avoided. All nodes within the cell monitor a different subset of all available frequencies, and share information with respect to acceptable and protected frequencies with each other via low-power, short-range communication. Each node then forms a list of available channels for communication, and chooses a single node to report this information back to the controller.

US patent application US 2008/0102849 A1 describes management of operating channels of an 802.11h compliant network. When implemented on a single access point, the system autonomously adjusts the operating channel so that the network operates on the channel with the least interference. When deployed on the access nodes in a campus or urban setting, the system rapidly converges to a stable interference minimising frequency re-use pattern with the average reduction in interference realised by each 802.11 cluster in the range of 19 dB (as device density increases, the expected reduction in interference increases with the exact gain in interference reduction a function of the specific propagation environment and network topology).

Reductions in interference are also realised by legacy systems which are not implementing the algorithm, but operating in the presence of the enhanced access points. When new access points are added to the network, the network automatically converges to a near optimal frequency reuse pattern. This is accomplished without any message passing between access nodes, without any adjustments to the existing 802.11 protocol, without user guidance, without prior or externally generated knowledge of the environment or network, and with minimal additional computational complexity at the access node. The mechanism of Dynamic Frequency Selection (DFS) described in that publication, for infrastructure based networks, uses the game theoretic approach for exchange of interference information.

US patent application US 2006/0084444A1 looks at ways of using unused portions of an allocated frequency spectrum in a wireless communications system that broadcasts content to wireless stations. A first wireless station may communicate with a second wireless station on an idle broadcast channel while keeping the resulting interference level below an acceptable maximum limit at the other wireless stations. Using interference level information that are measured at the wireless stations, the wireless station can negotiate with the other wireless station on an establishment channel for subsequent communications on one or more broadcast channels. The wireless station may receive broadcast content on a time slice that corresponds to a broadcast channel and that is further processed by the wireless station. Otherwise, the wireless station can utilise the corresponding time to measure an interference level for the corresponding channel or to transmit or receive data to/from another wireless station.

As will be appreciated from the above, the conventional technology does not optimise for the secondary network's battery consumption or allow seamless communications on channel switchover.

SUMMARY OF THE INVENTION

In general terms, the invention provides a method of selecting a channel for use by a node, such that, each node employing the method is able to utilise the spectrum to its advantage without the need to carry out individual primary detection and scanning or cooperative scanning by different nodes as seen in many existing research works in this field.

In a first aspect of the invention there is provided a method of accessing a channel in a wireless network having a plurality of communication nodes, the method comprising identifying a first channel available for use, forming a cognitive network to manage utilisation of said first channel, said cognitive network comprising a leader node and at least one of said plurality of said communication nodes, managing said cognitive network by means of said leader node including identifying a second channel available for use in an event that said first channel being no longer available for use, and switching to said second channel upon said second channel being identified.

An advantage of managing usage of a single communication channel between a plurality of communication nodes is that it allows all the communication nodes in the network to communicate in the same channel, thereby simplifying maintenance of the wireless network. Furthermore, managing the cognitive network by means of a leader node removes the need for each of the individual nodes to carry out individual primary detection and scanning. This provides the advantage that the overall secondary network's battery consumption can be significantly reduced compared to the methods applied in the prior art.

The step of managing may further includes the step of monitoring said first channel to determine said event that said first channel being no longer available for use.

In one embodiment of the above aspect the method may further comprise selecting a further leader node for managing said cognitive network on switching to said second channel.

Selection of a further leader node for managing the cognitive network provides the advantage that the task of a leader node can be shared among the plurality of communication nodes.

The further leader node may be selected from said at least one of said plurality of said communication nodes based on a credit mechanism such that each of said plurality of communication nodes receives an equal opportunity of being selected as a leader node. This effectively allows all the communication nodes in the network to obtain a fair saving in their resource usage.

The credit mechanism may be based on assigning a credit point to each of said at least one of said plurality of communication nodes and said leader node, upon associating with said cognitive network.

In a further embodiment of the invention, the method may further comprise varying said assigned credit point upon performing said step of monitoring said first channel.

The at least one of said plurality of communication nodes having the lowest credit point may be selected as the further leader node.

The step of switching to said second channel may include transmitting a warning message to said plurality of communication nodes upon determining said event that first channel being no longer available for use.

The step of identifying availability of a channel may include determining channel quality of said channel.

The usage of said first communication channel may be managed according to a channel access scheme. An example of the channel access scheme includes a carrier-sense multiple access scheme.

An identified advantage of performing the method steps in a centralised approach by means of a leader node is that it allows the over power consumption of the wireless network to be reduced, as opposed to that in the prior art in which the channel identification is carried out on every node individually. A further identified advantage is that it allows seamless communications on switching from said first channel to said second channel.

In a second aspect of the invention there is provided a communication device for accessing a channel in a wireless network having at least one further communication device, the communication device and the at least one further communication device being operable between a leader mode and a normal mode, the communication device comprising means for identifying a first channel available for use in the wireless network, means for forming a cognitive network to manage utilisation of said first channel, wherein said cognitive network comprises said communication device and said at least one further communication device, mode switching means operable to switch said communication device into said leader mode, wherein operating in said leader mode said communication device is operable to manage said cognitive network, to identify a second channel available for use in an event that said first channel being no longer available for use, and to switch to said second channel upon said second channel being identified.

BRIEF DESCRIPTION OF THE DRAWINGS

Embodiments of the present invention will now be described with reference to the accompanying drawings, wherein.

DETAILED DESCRIPTION

Specific embodiments of the present invention will be described in further detail on the basis of the attached diagrams. It will be appreciated that this is by way of example only, and should not be viewed as presenting any limitation on the scope of protection sought.

In the described embodiment, certain assumptions are established.

Firstly, all nodes in the secondary network communicate in a single vacant channel using any access mechanism, for example CSMA (Carrier Sense Multiple Access). It is known in the art that CSMA is a probabilistic Media Access Control (MAC) protocol in which a node verifies the absence of other traffic before transmitting on a shared transmission medium, such as a frequency spectrum.

Secondly, the primary detection is based on SINR (Signal to Interference plus Noise Ratio) threshold, as an example. However, it will be appreciated by the reader that there exist many other methods that can replace this approach.

Thirdly, the embodiment of the invention can be deployed where users spontaneously set up a network for co-operative tasks.

Fourthly, the described embodiment of the invention is intended, but not limited, to be used mainly for small to medium size networks. For large networks, the same theory could be extended to include clusters of nodes in different channels connected via bridge networks.

Figure 1:
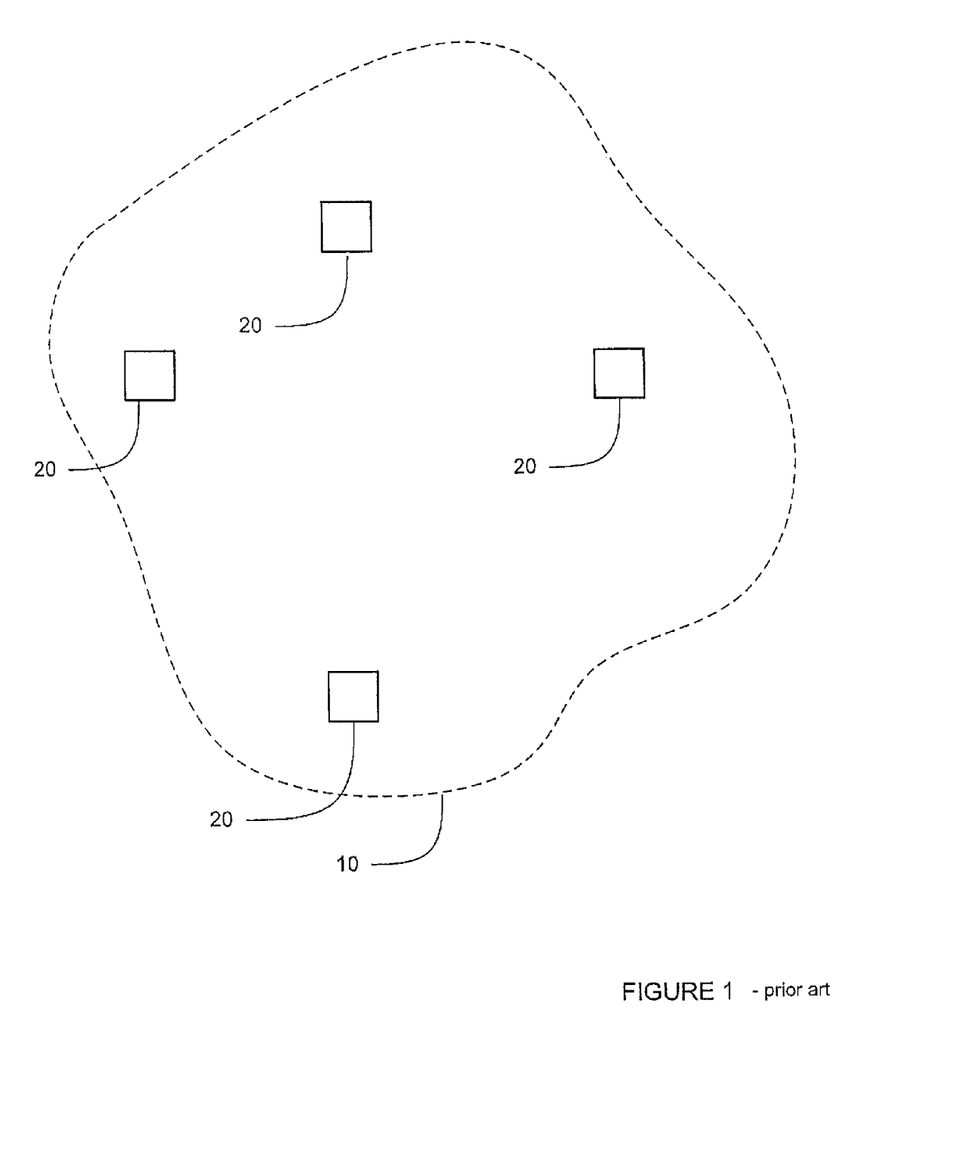
FIG. 1 illustrates a schematic diagram of a radio communications network according to an embodiment of the invention.
Figure 2:
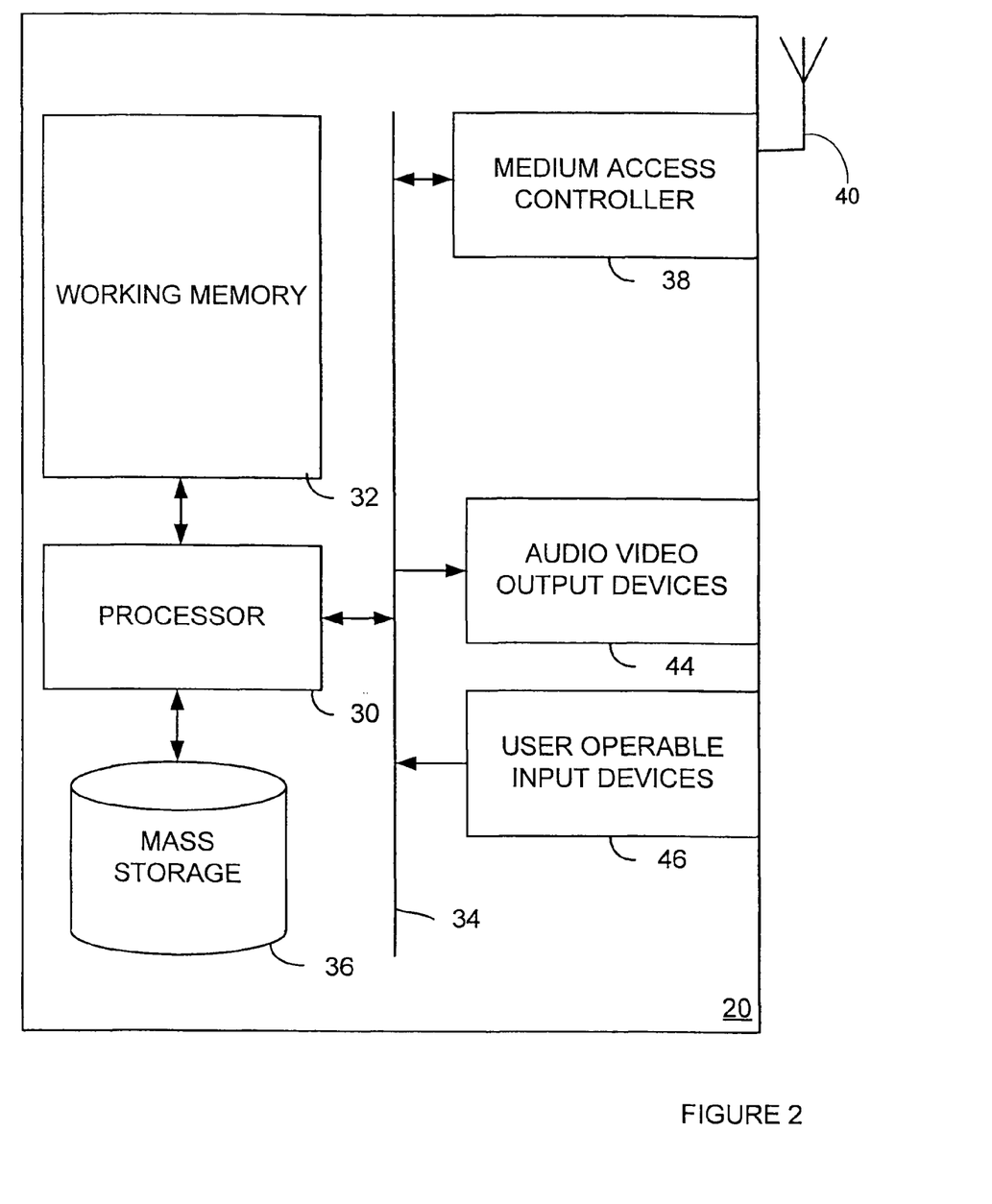
FIG. 2 illustrates a schematic diagram of a radio communications station of the network illustrated in FIG. 1.

In order to bring the embodiments of the invention into effect, a cognitive radio network is illustrated in FIG. 1, and a station (operating as a secondary unit) in FIG. 2.

The invention will be described with reference to a specific embodiment comprising a wireless communications network 10 as illustrated in FIG. 1. The network comprises a number of wireless communications stations 20, each of which is enabled to communicate on a channel defined in an available spectrum. Channels are, in this particular embodiment of the invention, defined in the spectrum by way of frequency. However, it will be appreciated by the following description, and previous discussion of aspects of the invention, that channels may be defined in the medium by any suitable means, such as time, code, space, or any combination thereof.

Each wireless communications station 20 is implemented in hardware of known type, as illustrated in FIG. 2. FIG. 2 illustrates the wireless communications station 20 as being implemented by means of a general purpose computer with communications facilities. In this case, communications facilities are provided by means of hardware, which is in turn configured by means of software. More particularly, the station 20 comprises a processor 30, in communication with the working memory 32 and a bus 34. A mass storage device (which, in this case, is a magnetic storage device, though other such storage devices would suffice) 36 is provided for long term storage of data and/or programs not in immediate use. A medium access controller 38 is connected to an antenna 40, to provide the station 20 with access to the wireless communications medium. The medium access controller will manage the station's access to the communications medium, i.e. the available radio spectrum, including functions such as scanning and accessing a free channel and other functions such as data assembly and transmission.

In conventional manner, the station 20 further comprises audiovisual output devices 44 and user operable input devices 46.

Between the working memory 32 and the mass storage device 36, the station 20 stores executable programs enabling the processor 30 to configure the station 20 to provide access to the wireless spectrum in accordance with the specific embodiment of the invention as will be described below.

In this example, the spectrum available for a cognitive user (opportunistic user) comprises a wideband spectrum, divided into distinct frequency bands. These frequency bands need not be of equal width and, in order to sense and handle such non-contiguous bands of frequency, channels are conveniently split into equal sub-channels of a minimum resolution for detection and sensing. These channels are designated Cn, where n is an integer, in FIG. 3.

Again, it will be appreciated that the foregoing example makes use of a wideband spectrum divided into frequency bands, wherein any suitable subdivision of the available medium could be employed, given the nature of the medium and the technology implementation.

It will be appreciated by the reader that the present disclosure is not limited to any particular method of sensing or detecting power level or interference temperature and thus detailed description of this function of the apparatus is not described in detail herein. Thus, QoS and other similar criteria can be determined by any known method, or by any method yet to be devised, and remain within the scope of the present invention.

Figure 3:
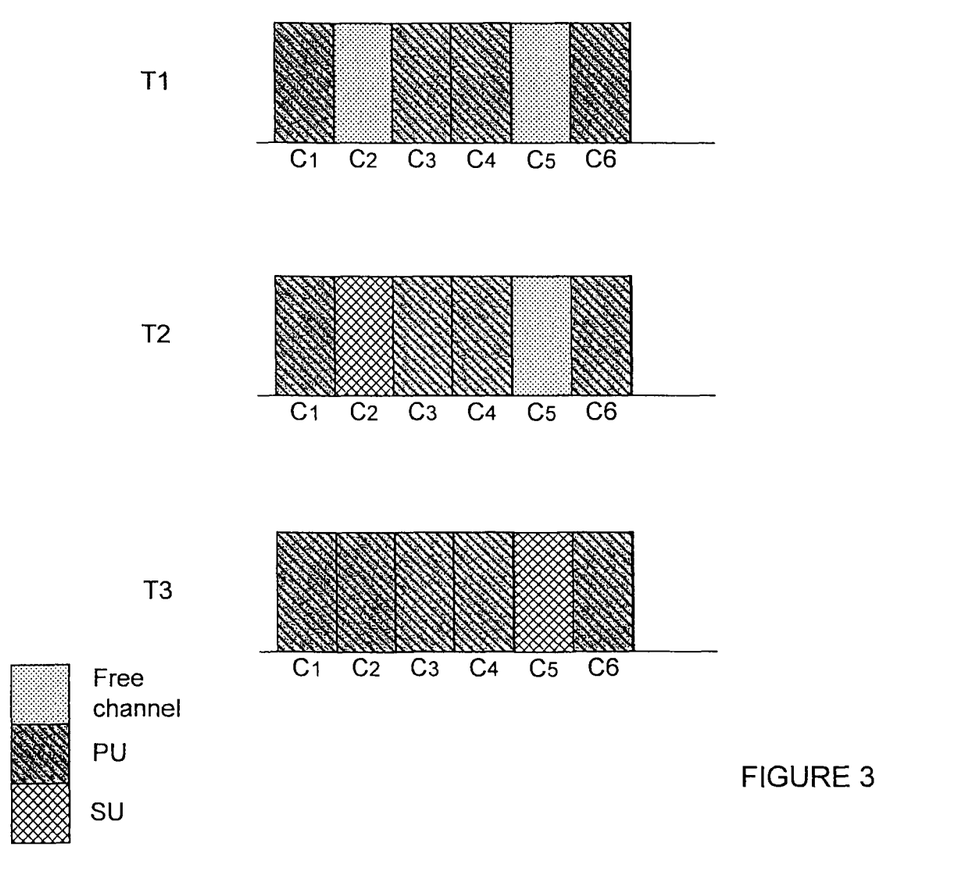
FIG. 3 illustrates a channel reservation arrangement for a spectrum portion in which cognitive radio is employed according to the embodiment of the invention.

The general concept of a SU accessing a channel, Cn, in a usable spectrum will now be described with reference to FIG. 3. As indicated, at time T1, channels C1, C3, C4, and C6, has been occupied by the PUs, and channels C2 and C5 are free channels (or spectrum holes) available for SUs transmissions. At time T2, a SU occupies channel C2 and starts transmitting in this channel until a PU reclaims it. At time T3, a PU reclaims the channel C2, and the SU scans for the next vacant channel (in this example, C5) and switches to that channel to resume communication.

The fundamental feature of this invention is that a secondary network is managed alongside the provision of a channel for use by a primary user, wherein all nodes of the secondary network communicate in one vacant channel using, for example, CSMA access, and on sensing the primary, the entire secondary network switches over to the next vacant channel "scanned by" a "leader" node as described below.

A cognitive secondary network operating in a vacant channel uses the following method for network formation and communication:

1. Form a Secondary Network

Figure 4:
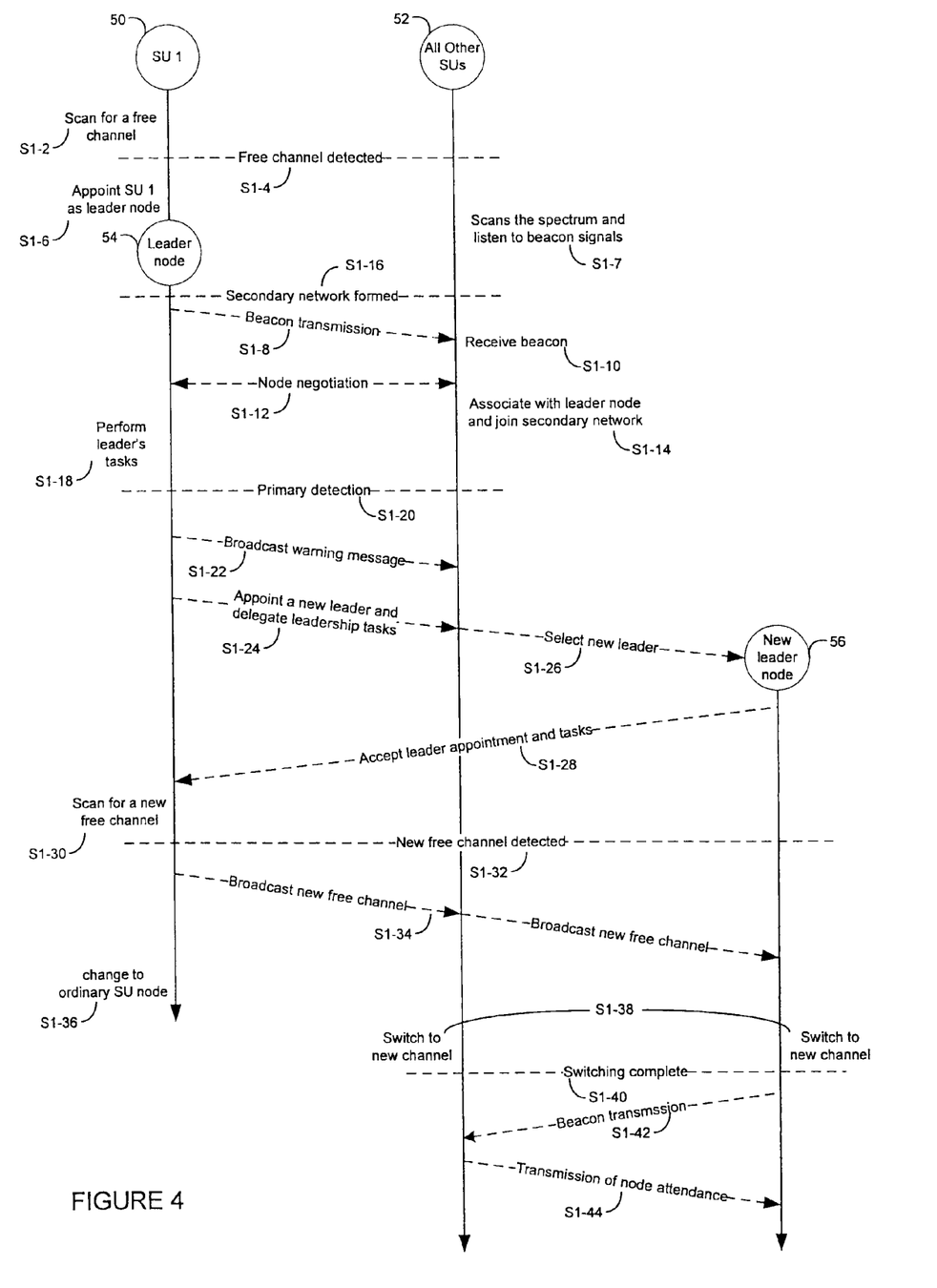
FIG. 4 illustrates stages of a method of identifying a channel for a Secondary Unit, utilisation of that identified channel, and disconnecting from that channel on reclamation of a channel by a Primary Unit, according to the embodiment of the invention.

Referring to FIG. 4, when a cognitive secondary node 50 or 52 intends to form a cognitive secondary network it scans for a vacant channel S1-2. On detection of a vacant channel S1-4, it declares itself as the "leader" node S1-6 and starts transmitting beacons S1-8 periodically. The beacon is transmitted on the frequency of the vacant channel and contains information on the number of nodes in the network, the status of the nodes and positions in the network scores table giving the TDMA access slots for communicating with the leader node 54.

2. Join an Existing Secondary Network

When a cognitive secondary node 52 intends to join an existing secondary network, it scans the spectrum and listens to beacons S1-7 transmitted from the "leader" node 54. On detection of a secondary network, the node joins the network S1-14 by associating with the "leader" node.

3. Tasks of the Leader Node S1-18

The leader node is configured to perform a number of tasks including:
  a. Periodic beacon transmissions providing information such as the number of nodes in the network, the status of the nodes, and positions of the nodes in a network scores table providing the TDMA access slots for communicating with the leader node. As will be described in the forthcoming paragraphs, the network score table provides a fair credit mechanism for appointing a new leader upon primary detection.
  b. New node negotiations.
  c. Maintain the network scores table for all the nodes associated with the network.
  d. Spectrum sensing for primary detection to determine whether a PU intends to reclaim the channel. This can be performed either periodically or based on historic data. The choice of sensing mechanism employed in any particular implementation is beyond the scope of this disclosure.
  e. Upon detection of a primary signal S1-20, the leader performs the following steps:
    i. Broadcasts a "warning" message S1-22 to all the nodes in the network so as to prepare the nodes to exit the channel and to switch to another available free channel.
    ii. Appoints a new leader S1-24, S1-26.
    iii. Once the newly appointed leader accepts the leadership appointment S1-28, the current leader scans for a new vacant channel S1-30.
    iv. Broadcasts the channel number/frequency of the newly detected vacant channel S1-34 to the nodes in the network. Switches itself to an ordinary SU node S1-36 once a new leader has been appointed and the channel number of the newly detected channel has been broadcasted. As shown in FIG. 4, all the SUs including the newly appointed leader switches to the new channel S1-38, S1-40. In the event that a node fails to receive information relating to the switching channel/frequency, it will then need to rescan to locate and rejoin the network.
  f. The newly appointed leader then transmits beacon periodically (S1-44).

4. Node Operations

The nodes in the secondary network respond according to commands given by the leader. For example, when the leader broadcasts a "warning" message, the nodes in network temporary suspend any ongoing communications and resume communications once the switch over to the new network is completed. This is advantageous in that ongoing communications are not abandoned. Hence, communications will not have to be re-established upon switching to a new network.

Once switching to the new network is completed S1-40, each of the nodes sends a message to the leader in a timely (TDMA) manner (or by means of a random back off) S1-44 to inform the leader of their successful switched over to the new channel.

5. Appointing a New Leader Using a Fair Credit Mechanism

The new leader is appointed on a fair credit mechanism to allow the responsibility of performing the leader's task to be equally shared among the nodes such that all the nodes in the cognitive network receive a fair saving in their resource usage. By way of an example, the fair credit mechanism will now be described.

On initial formation of the network, the self-appointed leader, Node 1, creates and holds a score table as shown in Table 1. As described in section 3 above, the score table is maintained and updated by the leader node.

For simplicity, three nodes are illustrated in this example. However, the person skilled in the art will appreciate that any number of nodes could also join the network. Furthermore, the size of the score table is subject to the number of nodes in the network.

Consider in this example, N1 occupies a vacant channel, C2, and transmits beacon signals periodically. N1 gets +A points for undertaking the responsibility of a leader as defined in section 3 above. In this example, the "A" is referred to as a numeric value of 10. N2 receives the beacon signals and is made aware of the existence of a vacant channel led by N1. Subsequently, N2 negotiates for connection and joins the network. Accordingly, N2 receives a lower score of −A. As indicated in Table 1, the rest of the secondary users receive a score of −A upon joining the network.

When the current leader node N1 switches to a new network upon a primary detection, it scans the table and assigns the node with the lowest score to be the new leader for the new network. In an event that two or more nodes have the same score, the node with the first entry among the nodes will be assigned to be the next leader. Therefore, in the example of Table 1, N2 will be appointed as the leader node for the new network since it is the node with the first entry in the table that has the lowest score.

TABLE 1

Score table

| Scan No. | Leader node | N1 | N2 | N3 | N4 |
|---|---|---|---|---|---|
| 1 | N1 | 10 | −10 | Not present | Not present |
| 2 | N2 | 10 − 10 = 0 | −10 + 10 = 0 | Not present | Not present |
| 3 | N1 | 0 + 10 = 10 | 0 − 10 = −10 | Not present | Not present |
| 4 | N2 | 10 − 10 = 0 | −10 + 10 = 0 | 0 − 10 = −10 | Not present |
| 5 | N3 | 0 − 10 = −10 | 0 − 10 = −10 | −10 + 10 = 0 | Not present |
| 6 | N1 | −10 + 10 = 0 | −10 − 10 = −20 | 0 − 10 = −10 | Not present |
| 7 | N2 | 0 − 10 = −10 | −20 + 10 = −10 | −10 − 10 = −20 | −10 |
| 8 | N3 | −10 − 10 = −20 | −10 − 10 = −20 | −20 + 10 = −10 | −10 − 10 = −20 |
| 9 | N1 | −20 + 10 = −10 | −20 − 10 = −30 | −10 − 10 = −20 | −20 − 10 = −30 |
| 10 | N2 | −10 − 10 = −20 | −30 + 10 = −20 | −20 − 10 = −30 | −30 − 10 = −40 |
| 11 | N4 | −20 − 10 = −30 | −20 − 10 = −30 | −30 − 10 = −40 | −40 + 10 = −30 |
| 12 | N3 | −30 − 10 = −40 | −30 − 10 = −40 | −40 − 10 = −30 | −30 − 10 = −40 |

6. Scanning and Switching the Channel

The leader scans for available vacant channels in the spectrum by monitoring the SINR of these channels. Essentially, the leader node grades the SINR of each vacant channel into three levels namely: "HIGH", "MOD" and "LOW". The leader node subsequently selects the channel in which the SINR activity is "LOW". The definitions of the SINR levels are given in Table 2.

TABLE 2

Definitions of SINR levels

| SINR LEVEL | Definition |
|---|---|
| HIGH | If the SINR activity is above an upper threshold limit, it will be assumed that the channel is heavily used by the primary. Hence, secondary scanning mode would not switch to this channel. |
| MOD | If the SINR activity is between the lower and upper threshold limits, it will be assumed that although the channel is not ideal, it may still potentially be used for transmission. In this situation, the leader may in the meantime operate in this channel and continue to scan for a channel with a "LOW" SINR level. When the leader node operates in a moderate activity channel, it is assumed that its operation is restricted to sending periodic beacon transmissions for updating the status of the network. Effectively, this denies the channel of active communications. However, it will be appreciated that such a restriction is subject to the regulation policy under which the spectrum is operating. |
| LOW | If the SINR activity is below a lower threshold limit, the channel is assumed to be vacant and hence the leader node can select such a channel for transmission. |

An example of the scanning and channel switching process will be now be described with reference to Table 3.

As shown in Table 3, two nodes (N1 and N2) are initially present in the network. Upon primary detection, the leader node, N1, scans for available channels in the spectrum. Table 3 illustrates the summary of information collected by the leader node after a scan has been performed. For simplicity and clarity in the description of the present embodiment only four channels (C1 to C4) are shown in Table 3.

In scan 1, the leader node, N1, selects channel C4 for establishing communications based on the SINR activity of C4 being "LOW". Accordingly, the nodes in the cognitive network utilises C4 until a PU enters this channel.

In the event that a PU enters C4, the procedure for switching into a new network is performed. As noted in Table 3 (scan 2) the responsibility of the leader node is handed over from N1 to N2 according to the credit mechanism described above.

Accordingly, upon a primary detection, N2 scans for a suitable channel in which communications can be established. As shown in Table 3, the only possible channel that allows the network to be switched over is C3 (SINR level="MOD"). It is also noted that the SINR level of C4 is now "HIGH" as it is currently occupied by a PU. According to the definition in Table 2, N2 is restricted to sending beacon messages, as communications in this channel is denied. N2 continues to scan for an available channel with a "LOW" SINR level.

In scan 3, the SINR level of C3 changes to "LOW" and communication in this channel is now allowed.

In scan 4, the network switches to C1 ("LOW" SINR) as the SINR of C3 is now "HIGH". In the meantime, N3 joins the network.

In scan 5, the network is switched to C2 and N3 is appointed as the new leader according to the credit mechanism described in the foregoing paragraphs.

The forgoing example illustrates the use of SINR threshold as a criterion for assessing the activity of a vacant channel. However, it will be readily understood by the skilled reader that any suitable method of assessing the activity of a vacant channel could be employed.

TABLE 3

| Scan No. | Nodes in the network | Leader node | C1 - SINR | C2 - SINR | C3 - SINR | C4 - SINR | Selected Channel | Active/ Denied |
|---|---|---|---|---|---|---|---|---|
| 1 | N1, N2 | N1 | HIGH | HIGH | MOD | LOW | C4 | Active |
| 2 | N1, N2 | N2 | HIGH | HIGH | MOD | HIGH | C3 | Denied |
| 3 | N1, N2 | N2 | HIGH | HIGH | LOW | MOD | C3 | Active |
| 4 | N1, N2, N3 | N1 | LOW | HIGH | HIGH | MOD | C1 | Active |
| 5 | N1, N2, N3 | N3 | HIGH | LOW | MOD | MOD | C2 | Active |

In summary, the invention provides the following advantages over the prior art:
1. The nodes in the secondary network operate in a single channel by means of CSMA access, resulting in ease of maintenance of the network.
2. The channel scanning is performed by one secondary node (leader node) and is triggered only when a primary user enters the channel. This is advantageous in that the overall battery consumption of the secondary nodes of the network is significantly reduced compared to the prior art in which secondary nodes performs the channel scanning individually.
3. Upon reception of a "warning" message, the node communications are paused and are resumed on switch over to a new channel, thereby enabling seamless communications.
4. All nodes get a fair saving of their resources as the leadership is shared among the nodes based on a fair credit mechanism.

While the foregoing specific description of an embodiment of the invention has been provided for the benefit of the skilled reader, it will be understood that it should not be read as mandating any restriction on the scope of the invention. The invention should be considered as characterised by the claims appended hereto, as interpreted with reference to, but not bound by, the supporting description.

The invention claimed is:

1. A method of accessing a channel in a wireless network having a plurality of communication nodes, the method comprising:
   identifying a first channel available for use;
   forming a cognitive network to manage utilisation of said first channel, said cognitive network including a leader node and at least one of said plurality of said communication nodes;
   managing said cognitive network by means of said leader node including identifying a second channel available for use in an event that said first channel being no longer available for use;
   switching to said second channel upon said second channel being identified; and
   selecting a further leader node for managing said cognitive network upon switching to said second channel, wherein said further leader node is selected from said at least one of said plurality of said communication nodes based on a credit mechanism.

2. The method according to claim 1, wherein said step of managing further includes the step of monitoring said first channel to determine said event that said first channel being no longer available for use.

3. The method according to claim 2, wherein said credit mechanism is such that each of said plurality of communication nodes receives an equal opportunity of being selected as a leader node.

4. The method according to claim 3, wherein the credit mechanism is based on assigning a credit point to each of said at least one of said plurality of communication nodes and said leader node, upon associating with said cognitive network.

5. The method according to claim 4, further comprising varying said assigned credit point upon performing said step of monitoring said first channel.

6. The method according to claim 4 or claim 5, wherein said at least one of said plurality of communication nodes having the lowest credit point is selected as the further leader node.

7. The method according to claim 2, wherein the step of switching to said second channel includes transmitting a warning message to said plurality of communication nodes upon determining said event that said first channel being no longer available for use.

8. The method according to claim 1, wherein the step of identifying availability of a channel includes determining channel quality of said channel.

9. The method according to claim 1, wherein usage of said first communication channel is managed according to a channel access scheme.

10. The method according to claim 9, wherein the channel access scheme includes a carrier-sense multiple access scheme.

11. A communication device for accessing a channel in a wireless network having at least one further communication device, the communication device and the at least one further communication device being operable between a leader mode and a normal mode, the communication device comprising:
    a processor for identifying a first channel available for use in the wireless network and for forming a cognitive network to manage utilisation of said first channel, wherein
    said cognitive network includes said communication device and said at least one further communication device, the processor being operable to switch said communication device into said leader mode, when operating in said leader mode said communication device is operable to manage said cognitive network, to identify a second channel available for use in an event that said first channel being no longer available for use, and to switch to said second channel upon said second channel being identified, the processor being operable for selecting said at least one further communication device to operate in said leader mode on switching to said second channel based on a credit scheme.

12. The communication device according to claim 11, when operating in said leader mode, is further operable to monitor said first channel to determined said event that said first channel being no longer available for use.

13. The communication device according to claim 11, wherein in said credit scheme whereby each of said communication devices in the cognitive network receives an equal opportunity of operating in said leader mode.

14. The communication device according to claim 13, when operating in the leader mode, is operable to assign a credit point based on said credit scheme to each of said at least one of said further communication device in the cognitive network.

15. The communication device according to claim 14, when operating in the leader mode, is operable to vary said assigned credit point when said first channel is being monitored.

16. The communication device according to claim 14 or claim 15, wherein the processor is further operable to select said at least one further communication device having the lowest credit to operate in said leader mode.

17. The communication device according to claim 12, when operating said leader mode, is operable to transmit a warning message to said at least one communication device in the cognitive network upon determining said event that first channel being no longer available for use.

18. The communication device according to claim 11, wherein the processor is further operable to determine channel quality of said channel.

19. The communication device according to claim 11, when operating in said leader mode, is operable to manage usage of said first communication channel according to a channel access scheme.

20. The communication device according to claim 19, wherein the channel access scheme includes a carrier-sense multiple access scheme.

21. The communication device according to claim 16, wherein the processor is operable to switch to said normal mode upon selecting said at least one further communication device to operate in said leader mode.

* * * * *